Nov. 18, 1958         J. M. HARRISON ET AL         2,860,374
                STRIPPER MECHANISM FOR INJECTION MOLDING
Filed Sept. 23, 1955                              4 Sheets-Sheet 4

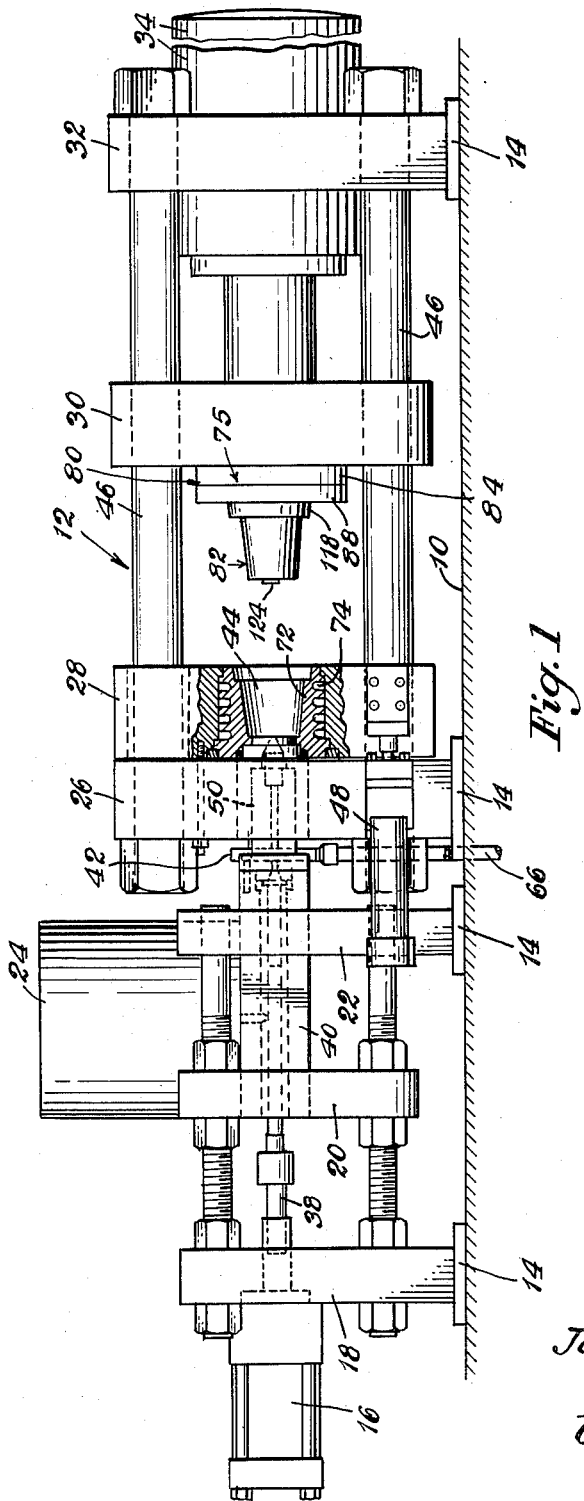

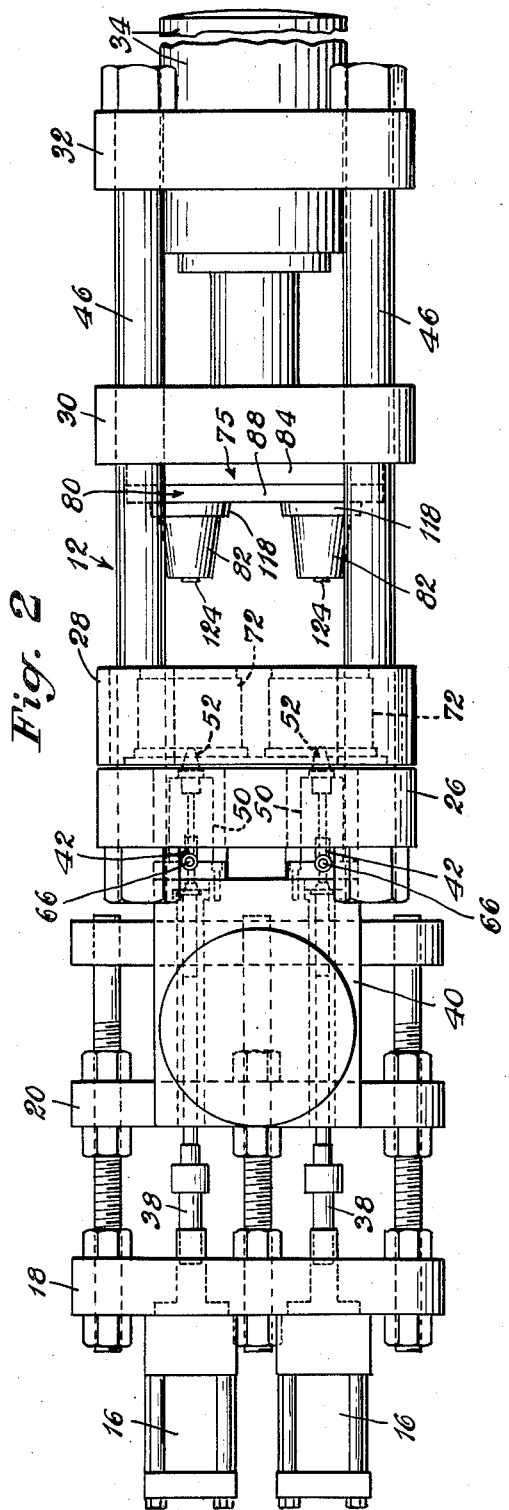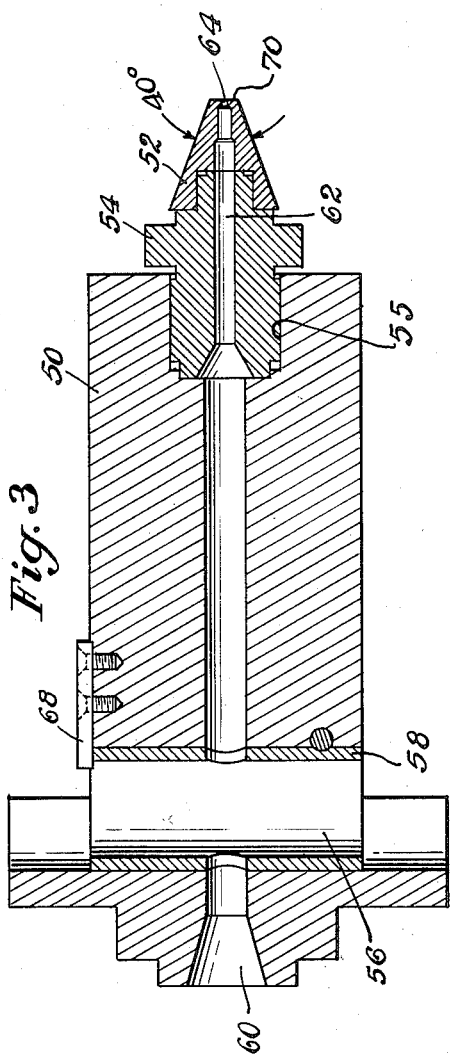

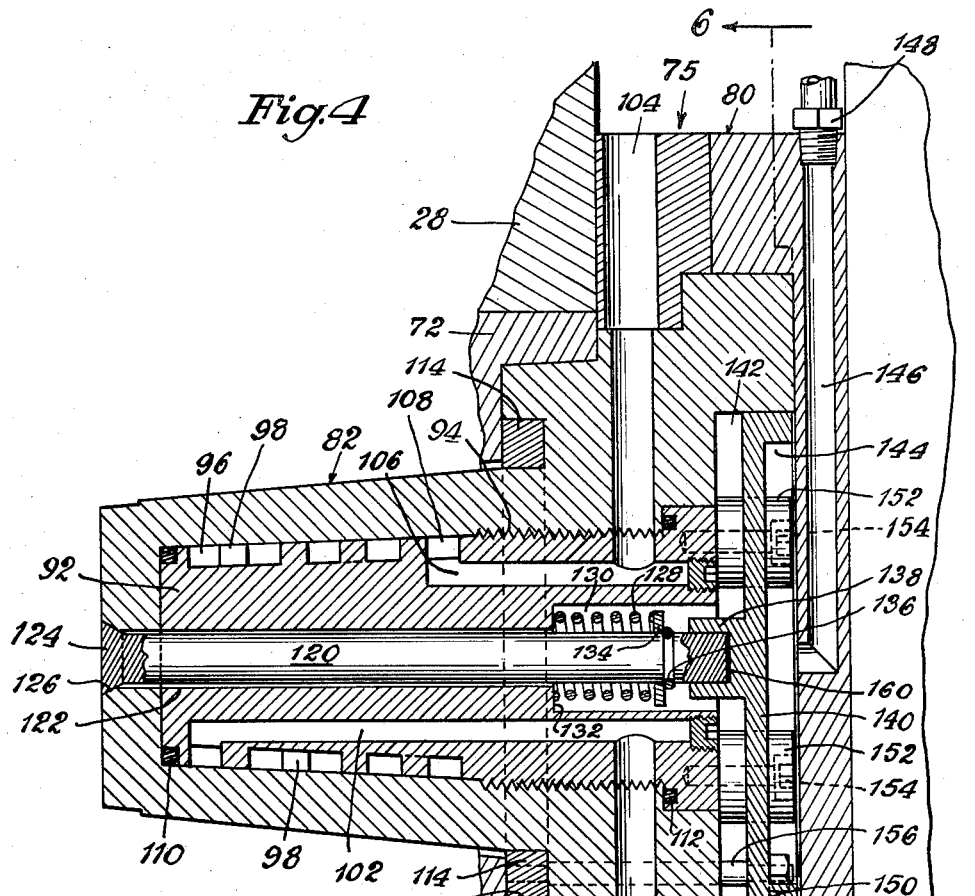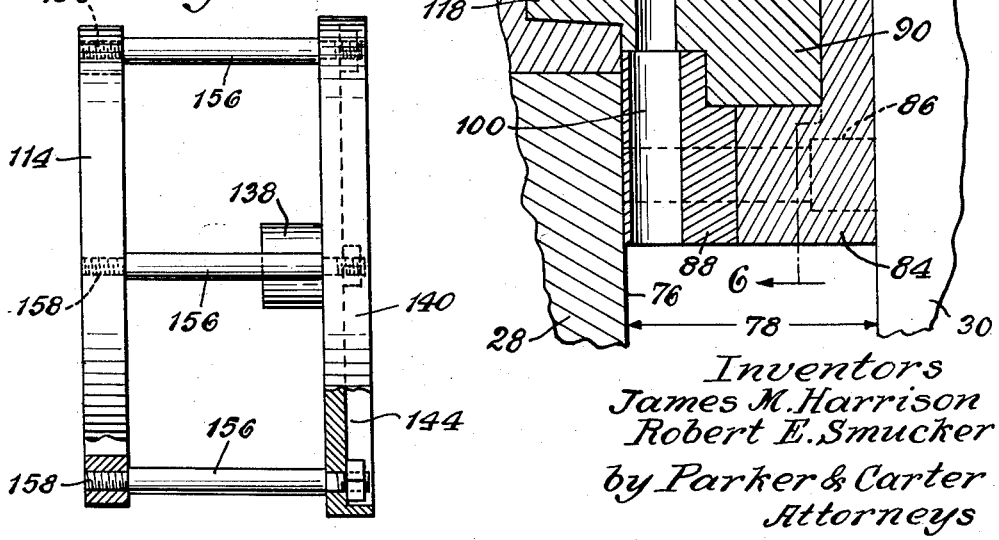

Inventors
James M. Harrison
Robert E. Smucker by Parker & Carter
        Attorneys

2,860,374

STRIPPER MECHANISM FOR INJECTION MOLDING

James M. Harrison and Robert E. Smucker, Fort Worth, Tex., assignors to Crown Machine and Tool Company, Inc., Fort Worth, Tex., a corporation of Texas Application September 23, 1955, Serial No. 536,070

5 Claims. (Cl. 18—30)

This invention lies in the field of molding equipment, specifically of the injection molding type although many of its features, characteristics and advantages are not necessarily limited to that segment of the molding field.

Since the recent development of plastics of all types by the large chemical organizations, it has been the desire of all molders and dealers in plastics to replace as many of the more expensive materials with less expensive plastic. For example, in many types of applications, prior to the present time, metals have been used almost exclusively. However these have proven very expensive in the past because metal generally has to be specially machined or is difficult to cast. Another example would be in the container field in which boxes, bags, cartons, cups and so forth have, prior to this time, been made almost exclusively from paper, paper products or cheap plyboard, low grade wood, or combinations thereof.

In recent years plastic molders have attempted to replace all types of wooden, paper and metal articles by plastic materials of various types with varying degrees of success, and our invention is concerned with one phase of what could be termed a substitution problem.

During the last several years, plastic molders all over the country have attempted unsatisfactorily to mold plastic cups that will compete successfully with paper cups. Prior to this time they have been generally unsuccessful for several reasons. First, plastic generally is a more expensive material than paper and although the shapes involved can be more easily acquired in molding plastic than in forming paper, nevertheless in the plastic field the cost of the finished article runs up due to the cost of the raw material. To combat this the large chemical houses are trying to bring the price of the raw material down and they have had a moderate degree of success. At the same time the molders have attempted to bring the price of the finished article down by making the walls of the article as thin as possible to save material.

The particular article involved in this application is a thin-walled cup-type container usable for holding liquids in automatic vending machines, such as a coffee cup or possibly an ice cream carton, or for various other types of food products, but generally it relates to a disposable or semipermanent container usable in a vending machine as a one-use cup or as a carton or around the household as a drinking vessel. Many problems immediately arise when a molder attempts to cut the wall thickness of a cup-type container, which at first would seem to defeat the entire project. For example, the molten plastic flowing into a very thin section will soldify before the entire cavity is filled, and to prevent this the areas around the cavity must be heated by band or strip heaters of various types strategically located to insure filing of the cavity. Furthermore, the parts of the mold must fit together very accurately because if the wall sections vary the slightest amount, the molten plastic may all flow into another part of the cavity and refuse to fill a thin side.

In addition to making cup-type containers as thin as possible in section, the equipment used must also be automatic and must operate rapidly, possibly on a twenty-four hour basis, so that the maximum amount of production is acquired. With any rapidly operating automatic equipment, many problems immediately arise. In our particular situation the automatic equipment must fit together very accurately in the mold area so that the mold sections do not vary, and we have found that a variation of as little as a few thousandths of an inch will prove disastrous.

As an example, the walls of normal cups are in the general neighborhood of .045" and the viscosity of the liquid plastic is such that an error of .005" one way or the other is of no particular consequence. But when the wall sections are reduced appreciably any error can become important. For example, we have reduced the wall section to .020" and if an error of .005" creeps in, it can be serious. By our invention we have successfully molded wall sections of .020". We can reduce our wall section to .018" in one case, and in another type of container we reduced the wall section to .012". At the present time we are actually producing cups which have a wall section of .010". Any error less than a few ten thousandths of an inch in a wall section of .010" would completely tie up the operation of an automatic machine and would prevent the formation of any cups due to short shots, hollow sections, and possibly damage to the equipment.

Therefore, a primary object of our invention is molding equipment, preferably of the automatic type, which gives increased rigidity between the interconnected molding parts so that the mold sections come together as accurate as possible.

Another object is a stripper mechanism for the molding apparatus which will force a thin section cup off of its core in a very rapid manner without damaging it.

Another object is a molding mechanism having a core element insertable into a cavity element to define a molding cavity for thin walled cups, in which the core element has a stripper ring, a stripper rod and air valve, an actuating mechanism for the entire stripper mechanism, an air connection for supplying high pressure air to the inside of each cup as it is stripped off of the core, a water coursing, and an internal support structure to provide rigidity for the core element at the same time that the center of gyration is moved forward, all of this structure being as compactly located as possible in the core element.

Other objects will appear from time to time in the ensuing specification and drawings in which:

Figure 1 is a side view of our molding mechanism with the molding structure open or borken apart, some of the parts being in section;

Figure 2 is a top view of Figure 1;

Figure 3 is an enlarged view, in section, of the injection nozzles usable in the mechanism of Figures 1 and 2;

Figure 4 is a sectional view, on an enlarged scale, of the core structure;

Figure 5 is a detailed view of the stripper mechanism separate from the core structure.

Figure 6:
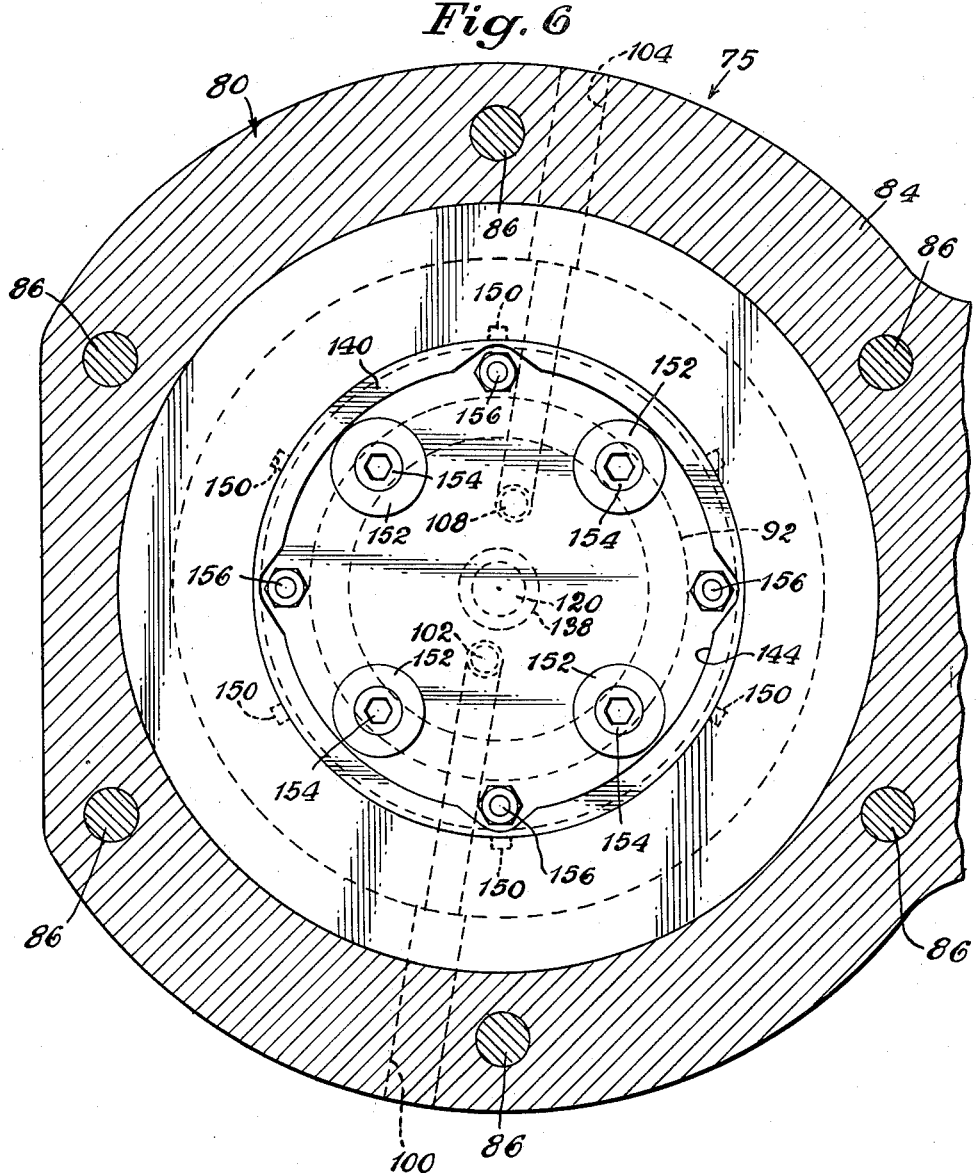
Figure 6 is a sectional view taken along lines 6—6 of Figure 4.

We shall first describe the overall mechanism generally and in detail, and we shall later explain its use, operation and function.

Generally in Figure 1 we disclose a base 10 of any suitable type supporting an injection frame indicated generally at 12. The overall frame is supported on pads or feet 14, each of which is welded or otherwise connected to the main base and provides a dimensionally flat surface on which to mount the overall frame. Starting from the left side of the unit in Figures 1 and 2, two hydraulic cylinders 16 are mounted on a suitable supporting platen 18. Two supporting platens 20 and 22, spaced from each other, support a pot or preplasticizer 24. An anchor platen 26 is next to a cavity platen 28, and a movable platen 30 carries the core structure which is insertable into a cavity in the cavity platen. A support platen 32 supports a clamp cylinder 34 which actuates the movable platen in timed relationship to the injection mechanism.

The hydraulic cylinders 16 each actuates an injection ram 38 which is connected to an injection cylinder 40. Each injection cylinder has a nozzle structure 42 in Figure 2 which communicates with a cavity 44 in the cavity platen 28. Tie rods 46 extending between the anchor and support platens 26 and 32 provide a mounting for the cavity and movable platens, each of which may be slidable along the tie rods with the movable platen being actuated by the clamp cylinder 36. The cavity platen may be biased away from the anchor platen along the tie rods by hydraulic cylinder 48 so that the tip of the nozzle structure is separated from its seat during the noninjection portion of an injection cycle. This arrangement is fully shown, described and claimed in our copending application, Serial No. 466,482, filed November 3, 1954, and it will only be referred to generally hereinafter. In that application the movable platen is biased to the left in Figure 1 by the clamp cylinder until it picks up the cavity platen and forces the seat against the tip of the nozzle.

In Figure 3 we have shown the details of the injection nozzle which includes a body member 50 having a removable nozzle tip 52 mounted on a nozzle 54 which is inserted in a removable manner in a socket 55 in the body member. A suitable hole 56, with a sleeve 58 is provided in the rear portion of the nozzle, and a central passage 60, extends through the body member to an aligned central passage 62 in the nozzle tapering in steps to a pinhole opening 64 in the tip. The hole 56 is adapted to receive a reciprocating valve 66 in Figure 1, held in place by a suitable key or the like 68. We have found that the angle of the nozzle tip should be approximately 40 degrees and should be blunted, as at 70, so that the flat area defines a part of the molding cavity as shown in our prior application. We have also found that if the nozzle tip is made of beryllium copper, the heat transfer effected through it to the molten plastic will insure that the bottom will not be pulled out of the cups when the mold parts are separated and the pinhole will solidify sufficiently when it is out of contact with the nozzle seat. Thus no runners or sprues are necessary.

The cavity 44 in the cavity platen 28 is formed in an insert 72 having suitable water coursing 74 as set forth in our prior application.

Turning specifically to the core structure, in Figure 4 we have shown in a sectional view a core structure 75 which is mounted on the forward face of the movable platen 30 and is adapted to abut the cavity platen when the projecting core element itself is inserted in the cavity, and it should be noticed that when the molding structure is closed the cavity platen will abut the forward face 76 of the core structure and be separated from the movable platen only by the distance 78.

Generally, this core structure includes a core base 80 and a projecting core element 82. A core backup plate 84 is bolted or otherwise suitably secured in a plurality of places at 86 to a core plate 88 so that an enlarged flange portion 90 at the end of the core element will be clamped between them. The core element is generally hollow and a core insert 92 is screwed into the core element as at 94 and is provided with a plurality of equally spaced grooves or rings 96. These rings or grooves are interconnected by alternate slots 98 to provide a continuous channel between a water inlet 100 communicating with a central passage 102 that opens in to the outermost ring and a water outlet 104 which communicates with a central passage 106 connected to the innermost ring or groove 108. Suitable seals 110 and 112 are provided on each side of the water coursing to prevent leakage.

A stripper mechanism includes a ring 114 mounted on a groove 116 in the face of an enlarged piloting portion 118 on the core element which is adapted to be moved in and out to apply pressure against the edge of a cup molded around the core element. A central push rod and air valve 120 is slidably disposed in an oversized central opening 122 in the core element which applies pressure to the bottom of the cup. A valve 124 on the end of the rod engages a correspondingly formed seat 126 opening into the face of the core element. This structure constitutes an air valve which is normally biased shut by a coil spring 128 around the end of the rod in an enlarged portion 130 of the central channel, providing a seat 132 for one end of the spring with the other end being held by a suitable washer 134 and snap ring 136 on the rod. The end of the air valve extends into a boss or cuplike formation 138 projecting from an air piston 140 slidably mounted in an air cylinder 142. The air piston is a flat platelike object rather than the normal elongated piston, with one side being scooped out or offset as at 144 to provide communication with an inlet air line 146 having a suitable connection 148 to a suitable source of pressure air, not shown. The sides of the air cylinder are provided with one or more diagonal grooves 150 which effect a bypass around the air piston so that when the piston moves to the left in Figure 4, air will flow from the recessed portion 144 on one side of the piston through the bypasses or grooves 150 to the other side of the air piston, then into the enlarged chamber 130, between the push rod and the wall of the enlarged channel to the valve seat where it is allowed to escape inside to the bottom of a molded cup when the valve is unseated. The grooves or bypasses 150 are slanted, as shown in Figure 4, so that in the extreme rightward position air will not flow around the piston.

A plurality of posts or pillars 152 extend from the backup plate into the core element through the air piston, and at the same time that they provide a mounting for the flat platelike piston to prevent it from canting and sticking in the cylinder, they also rigidly tie the core element to the backup plate to prevent any wobbling or misalignment of the core element in the cavity. These pillars or posts can be suitably tied into the core element by bolts or studs 154. The air piston also carries a plurality of studs 156 which extend forwardly through suitable passage in the core element and are screwed or otherwise connected at their outward end in the stripper ring at 158 so that movement of the piston is immediately communicated to the stripper ring.

The entire core assembly is suitably bolted or otherwise secured to the face of the movable platen and aligned with the cavity in the cavity platen, and we have not shown this structure as it would merely constitute flanges and bolts extending through the core base with countersunk portion in the core base.

The end of the push rod or air valve 120 is held by the cuplike formation 138 on the piston, but is shortened so that a slight clearance exists at 160, in the nature of a thirty-secondth of an inch, so that the air piston and stripper ring 114 move a slight initial distance before the push rod is picked up. Thus the initial stripping pressure will be applied to the outer edge of the cup before any pressure is applied to the bottom.

The use, operation and function of our invention are as follows:

This plastic molding mechanism is intended to form thin walled cups rapidly so that the price of the finished article can be substantially reduced to compete on the price basis with paper cups. To do this the walls of the cups and the total material used must be slight, and in automatic equipment this is difficult to do because thin clearance between a cavity and an inserted core is subject to stress misalignment causing an off center condition of the core in the cavity and resulting in intolerable difficulty in filling the cavity with plastic.

In our prior application, among other things we disclosed and claimed a molding mechanism for molding thin wall cups. In that application the core platen carrying its core structure was reciprocally operated by a clamp cylinder to close the mold and reopen it after a cup has been formed. The core structure mounted on the face of the movable platen extended quite a distance beyond the face of the platen, and the radius of gyration of that structure was quite large. This resulted in substantial misalignment and wobbling of the extended core structure, and we have found that such a unit will produce many defective cups due to short shots resulting from insufficient clearance between the mold parts so that plastic material will not flow to all areas of the molding cavity.

To eliminate this condition, one of the primary objects of this invention is to reduce the radius of gyration of the core structure mounted on the movable platen and we have enclosed our stripper mechanism, water course and mounting structure all within an integral core base with a core element extending beyond it. Thus the core platen and cavity platen are as close together as they can possibly get when the mold is closed, as shown in Figure 4. Any wobbling of the core or tilting will be substantially, if not completely, eliminated.

In stripping the molded cup from the core, we have found that it is decidely advantageous to apply pressure to the peripheral edge of the cup before pressure is applied to the center, and to do this we use a delayed reaction stripper mechanism but with a unitary actuating means so that the sides of the cut will first be subjected to the force of the stripper mechanism before the center in the bottom is pushed, and lastly, air is admitted through the air valve so that the cup is blown off of the core.

It should also be noted that we incorporate two complete and independent injection systems. The material is fed from a single preplasticizing pot, and channeled into two separate injection cylinders. The cylinders are separately controlled and provided with separate nozzles, separate injection rams, separate heating systems, separate pressure controls, and separate cutoff valves. We also use one solid block to support the two injection cylinders and it also serves as a support for the preplasticizer. This arrangement has a number of advantages. It will double the output of a normal machine while retaining independent injection units which can be independently adjusted as to pressures, temperatures, etc. Thirdly, if desired we can run two different items at the same time by making special molds and cavity inserts.

Additionally, the relative independence of each injection system enables us to eliminate packing or short shots which are usually experienced with multiple cavity molds. Additionally, even though we have a multiple cavity unit, we still have no runners or sprues, and therefore no waste material to be reground. One of the important points of such a unit is that each injection system can be separately adjusted as to pressure and temperature, and this is a must with a system making thin wall sections. Many variables exist in such a setup and it is difficult to predict precise pressures and temperatures that will be needed to inject a particular plastic into a ten thousandths clearance cavity. For this reason two molds side by side, and in other respects identical, may require different conditions. We therefore provide separate controls in our unit so that any misalignment of the core insert in the cavity resulting in additional pressure or resistance on one side of the cavity can be quickly compensated for.

By our invention we acquire the independent control of a single unit with the output of a double unit and at the same time we have runnerless injection with a high output of thin section plastic cups and little or no waste material.

While we have shown and described a preferred form of our invention, it should be understood that suitable modifications, substitutions, alterations, changes and revisions can be made without departing from the invention's fundamental theme. We therefore wish that the invention be unrestricted except as by the appended claims.

We claim:

1. In a molding device for plastic or the like, a frame, a cavity platen on the frame with at least one cavity in it, a core structure on the frame adapted to be inserted in the cavity to define a molding cavity, the core structure and cavity being constructed so that they define a thin wall cup-like molding cavity between them for molding cups, means for injecting liquid plastic into the molding cavity, the core structure having a generally frusto conical insertable core element, a stripper ring around the large end of the core element defining the top edge of a molded cup, a stripper rod generally in the center of the core element adapted to bear against the bottom of a molded cup, and means for actuating the striper rod and ring in timed relation to each other so that pressure will be brought against the edge of a molded cup by the stripper ring ahead of the stripper rod.

2. The structure of claim 1 in which the stripper rod is an air valve adapted to admit pressure air to the inside of a molded cup after it has been first loosened by the stripper rod and ring.

3. The structure of claim 1 characterized by and including an air cylinder and piston for actuating both the stripper rod and ring, and a bypass for the piston so that when the piston is moved forward by air pressure to strip a molded cup from the core element, air will flow through the bypass to the air valve.

4. The structure of claim 1 further characterized in that the stripper ring is a continuous solid annulus, the stripper rod opening through the center of the core element and being against the center of a molded cup's bottom.

5. The structure of claim 1 further characterized by and including a fluid cylinder and piston for actuating the stripper rod and ring to an extended position to strip a molded cup from the core element, and spring means for returning the rod and ring to a withdrawn position for the next stripping operation.

References Cited in the file of this patent

UNITED STATES PATENTS

| 2,309,729 | Gordon | Feb. 2, 1943 |
| 2,333,059 | Tucker | Oct. 26, 1943 |
| 2,377,393 | Wiley | June 5, 1945 |
| 2,396,406 | Anderson | Mar. 12, 1946 |
| 2,773,284 | Kelly | Dec. 11, 1956 |

FOREIGN PATENTS

| 571,071 | Great Britain | Aug. 3, 1945 |